United States Patent
Mizuno et al.

(10) Patent No.: US 8,762,639 B2
(45) Date of Patent: *Jun. 24, 2014

(54) STORAGE SYSTEM, STORAGE APPARATUS, AND OPTIMIZATION METHOD OF STORAGE AREAS OF STORAGE SYSTEM

(71) Applicant: Hitachi, Ltd., Tokyo (JP)

(72) Inventors: Yoichi Mizuno, Yokohama (JP); Yoshinori Ohira, Kawasaki (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/793,471

(22) Filed: Mar. 11, 2013

(65) Prior Publication Data

US 2013/0191593 A1 Jul. 25, 2013

Related U.S. Application Data

(63) Continuation of application No. 12/664,967, filed as application No. PCT/JP2009/005383 on Oct. 15, 2009, now Pat. No. 8,402,215.

(51) Int. Cl.
G06F 13/00 (2006.01)

(52) U.S. Cl.
USPC .................... 711/114; 711/E12.002

(58) Field of Classification Search
None
See application file for complete search history.

(56) References Cited

U.S. PATENT DOCUMENTS

| | | | |
|---|---|---|---|
| 6,823,442 B1 | 11/2004 | Cameron | |
| 2005/0216665 A1* | 9/2005 | Takakuwa | 711/114 |
| 2007/0113036 A1 | 5/2007 | Gal-Oz | |
| 2008/0082778 A1 | 4/2008 | Inoue et al. | |
| 2008/0235448 A1* | 9/2008 | Inoue et al. | 711/114 |

FOREIGN PATENT DOCUMENTS

| | | |
|---|---|---|
| EP | 1 973 030 A2 | 9/2008 |
| JP | 2005-284632 A | 10/2005 |
| JP | 2008-084053 A | 4/2008 |
| JP | 2008-234158 A | 10/2008 |

OTHER PUBLICATIONS

Japanese Office Action received in Japanese Application No. 2012-501484 dated May 7, 2013.

* cited by examiner

*Primary Examiner* — Sean D Rossiter
(74) *Attorney, Agent, or Firm* — Mattingly & Malur, PC

(57) ABSTRACT

This invention is intended for the purpose of providing the storage system, the storage apparatus, and the storage system by which, even if the storage areas allocated to the virtual volume are managed in management units set by the RAID group, overhead for parity calculation does not become excessive. This invention, by releasing a specific management unit not fully utilized for page allocation from allocation to the virtual volume and migrating the allocated pages belonging to this specific management unit to the other management unit, makes the storage areas of the specific management unit available for the write accesses for the other virtual volumes from the host computer.

6 Claims, 15 Drawing Sheets

FIG.4

PAGE MANAGEMENT TABLE

| CHUNK ID | PAGE ID | STATUS | CLASS | PAGE PRIORITY |
|---|---|---|---|---|
| 0 | 0 | ALLOCATED | DATA | 3 |
|  | 1 | ALLOCATED | DATA | 1 |
|  | 2 | UNALLOCATED | - | 0 |
|  | 3 | UNALLOCATED | - | 0 |
|  | 4 | UNALLOCATED | - | 0 |
| 1 | 10 | ALLOCATED | INDEX | 5 |
|  | 11 | UNALLOCATED | - | 0 |
|  | 12 | ALLOCATED | DATA | 3 |
|  | 13 | UNALLOCATED | - | 0 |
|  | 14 | ALLOCATED | DATA | 1 |
| 2 | 20 | ALLOCATED | DATA | 1 |
|  | 21 | ALLOCATED | DATA | 1 |
|  | 22 | UNALLOCATED | - | 0 |
|  | 23 | ALLOCATED | DATA | 3 |
|  | 24 | UNALLOCATED | - | 0 |
| 3 | 31 | FORMATTING | - | 0 |
|  | 32 | ... | ... | ... |
|  | ... | ... | ... | ... |
| ... | ... | ... | ... | ... |

FIG.5

RG MANAGEMENT TABLE

| VIRTUAL VOLUME | RAID GROUP | CHUNK SIZE | PAGE SIZE | USED CHUNKS | TOTAL ALLOCATED PAGES |
|---|---|---|---|---|---|
| 0 | 0 | 100MB | 20MB | 3 | 8 |
|   | 1 | 100MB | 20MB | 3 | 9 |
|   | 2 | 100MB | 20MB | 1 | 1 |
| 1 | 0 | 1GB | 64KB | 180 | 2110 |
|   |   | 2GB | ... | ... | ... |
|   | 1 | ... | ... | ... | ... |
|   | ... | ... | ... | ... | ... |
| ... | ... | ... | ... | ... | ... |

FIG.6

CHUNK MANAGEMENT TABLE

| VIRTUAL VOLUME | RAID GROUP | CHUNK ID | ALLOCATED PAGES | UNALLOCATED PAGES | CHUNK PRIORITY |
|---|---|---|---|---|---|
| 0 | 0 | 0 | 2 | 3 | 4 |
|   |   | 1 | 3 | 2 | 9 |
|   |   | 2 | 3 | 2 | 5 |
|   |   | - | - | - | - |
|   | 1 | 10 | 2 | 3 | 2 |
|   |   | 11 | 3 | 2 | 7 |
|   |   | 12 | 4 | 1 | 8 |
|   |   | - | - | - | - |
|   | 2 | 20 | 1 | 4 | 1 |
|   |   | - | - | - | - |
| 1 | 0 | 4 | ... | ... | ... |
|   |   | 9 | ... | ... | ... |
|   |   | - | ... | ... | ... |
|   | ... | ... | ... | ... | ... |
| ... | ... | ... | ... | ... | ... |

FIG.7

RELOCATION MANAGEMENT TABLE
(FOR EACH VIRTUAL VOLUME)

| VIRTUAL VOLUME | MODE | RAID GROUP | SAVED CHUNKS | DEFICIENT NUMBER OF CHUNKS |
|---|---|---|---|---|
| 0 | AUTOMATIC, CAPACITY PRIORITY | 0 | 1 | 0 |
| | | 1 | 11,12 | 0 |
| | | 2 | 20 | 0 |
| | | - | - | - |

FIG.8

RELEASED CHUNK MANAGEMENT TABLE
(FOR EACH VIRTUAL VOLUME)

| VIRTUAL VOLUME | CHUNK ID | ALLOCATED PAGES | UNALLOCATED PAGES | CHUNK PRIORITY |
|---|---|---|---|---|
| 0 | 0 | 2 | 3 | 4 |
| | 10 | 3 | 2 | 2 |
| | 1 | 3 | 2 | 9 |
| | - | - | - | - |

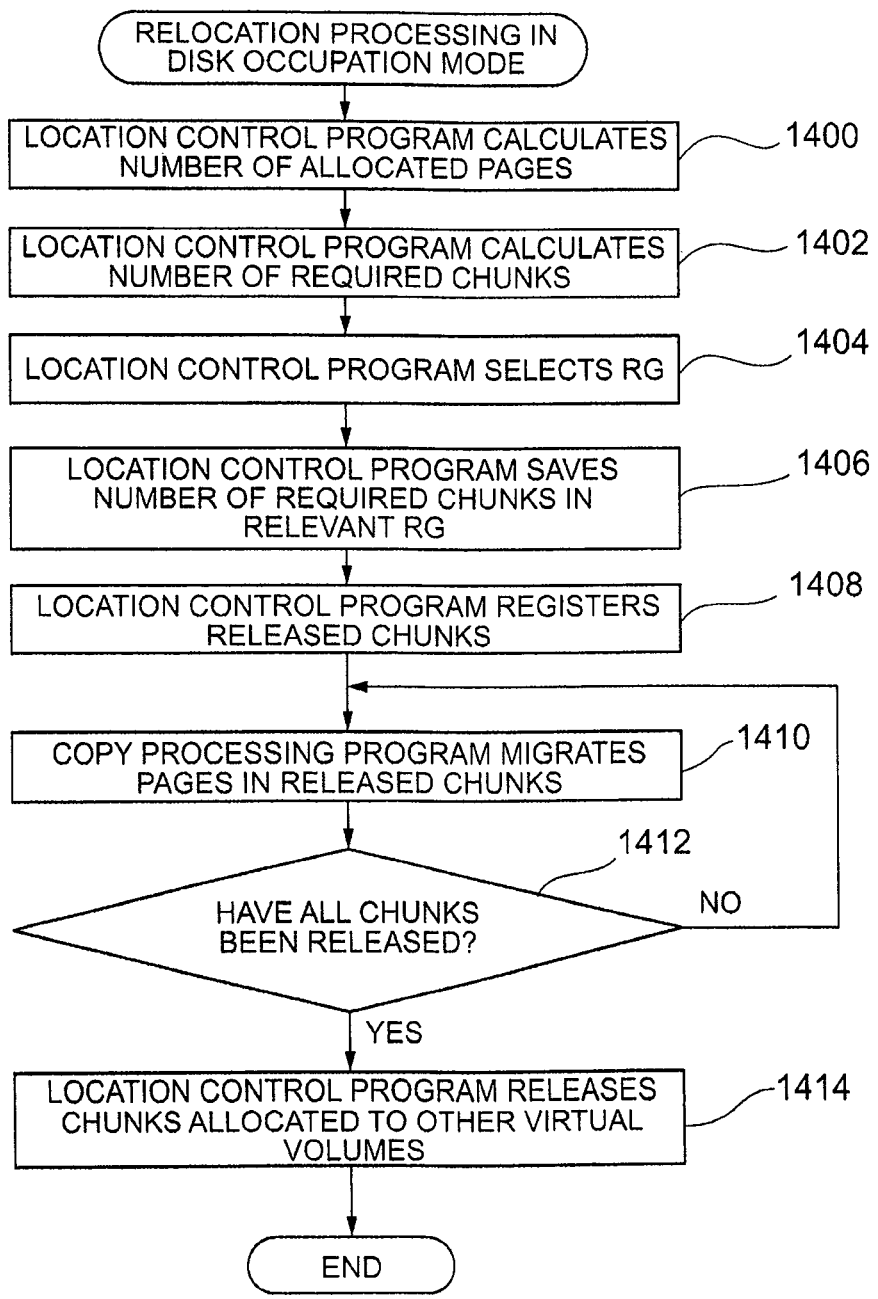

STORAGE SYSTEM, STORAGE APPARATUS, AND OPTIMIZATION METHOD OF STORAGE AREAS OF STORAGE SYSTEM

This application is a continuation of U.S. patent application Ser. No. 12/664,967, filed Dec. 16, 2009.

TECHNICAL FIELD

This invention relates to a storage system, specifically to a storage system which dynamically allocates a storage capacity to a host computer. This invention additionally relates to a storage apparatus of a storage system and an optimization method of storage areas of the storage system.

BACKGROUND ART

Conventionally, a computing system providing a large-scale data storage service to host computers exists. This computing system is known as a storage system or a computer system comprising host computers, a storage apparatus to which the host computers are connected, and a management device of the storage apparatus.

The storage apparatus manages multiple hard disks by the RAID (Redundant Array of Independent/Inexpensive Disks) method. The storage apparatus then logically configures physical storage areas included in the multiple hard disks as a RAID group and provides these as logical volumes to the host computers. The host computers access the logical volumes and request the reading or writing of data to the storage apparatus.

The storage apparatus, by allocating multiple pages to the logical volumes, maintains the data for which the write access is made from the host computer to the logical volumes in the storage areas of the storage device. A page is a logical unit to which a certain degree of storage capacity is given as a result of the physical storage area of the storage device being divided.

As one of the logical configuring technologies of this type, a system in which the storage capacity of the logical volumes is virtualized is known as thin provisioning (e.g., U.S. Pat. No. 6,823,442).

This system sets a logical volume as a virtual volume having a virtualized storage capacity and, each time a write request for the block address of the virtual volume is received from the host computer, allocates pages to the block address for which the write request is made, and changes the actual storage capacity of the virtual volume dynamically.

A group comprising actual storage areas for allocating storage areas to the virtual volume is called a pool and, in this pool, multiple logical volumes of a RAID group called pool volumes exist. Pages are allocated to the virtual volume from the pool volumes.

Though the storage apparatus intends to select pages from the multiple pool volumes equally, with the passage of a long time, a problem arises in that this equality is damaged, which deteriorates the response performance in response to the I/O from the host computer. Therefore, Japanese Unexamined Patent Application Publication No. 2008-234158 discloses the migration of pages among multiple pool volumes.

CITATION LIST

Patent Literature (PTL)

[PTL 1]
U.S. Pat. No. 6,823,442

[PTL 2]
Japanese Unexamined Patent Application Publication No. 2008-234158

SUMMARY OF INVENTION

Technical Problem

U.S. Pat. No. 6,823,442 discloses that the storage areas of multiple disk devices are managed in management units of chunklets, and that pages are allocated from the chunklets to the virtual volume.

However, if the storage apparatus attempts to allocate multiple pages belonging to the same management unit to different virtual volumes, as long as the management unit is set by the same RAID group, a problem arises in that multiple pages defined by the common parity are allocated to controllers with different parity calculation, which causes excessively large overhead for the parity calculation.

Meanwhile, if the storage apparatus allocates multiple pages belonging to one management unit to the same virtual volume and if a page of a certain management unit is migrated to another management unit and the virtual volume as the allocation destination is different, page migration is limited to a different virtual volume as the allocation destination.

This case has a problem in that the storage apparatus cannot utilize the storage areas included in the management unit efficiently and that, furthermore, page allocation among multiple pool volumes cannot be adjusted equally as page migration cannot be performed, which cannot fully solve the deterioration of the response performance in response to the I/O from the host computer.

Therefore, an object of this invention is to provide a storage system, a storage apparatus, and an optimization method of storage areas of the storage system in which, even if the storage areas allocated to the virtual volume are managed in management units set in the RAID group, overhead for parity calculation does not become excessive.

Furthermore, another object of this invention is to provide a storage system, a storage apparatus, and an optimization method of storage areas of the storage system in which, even if the storage areas allocated to the virtual volumes are managed in management units set in the RAID group, the storage areas in the management units can be utilized efficiently.

Furthermore, another object of this invention is to provide a storage system, a storage apparatus, and an optimization method of storage areas in the storage system in which, even if the storage areas allocated to the logical volume are managed in management units set in the RAID group, the deterioration of the response performance in response to the I/O from the computer can be sufficiently eliminated.

Solution to Problem

If the storage apparatus allocates multiple pages belonging to one management unit to the same virtual volume, though the management unit includes a large number of pages not used to be allocated to the virtual volume, the storage apparatus cannot use these pages for allocating to the other virtual volumes.

Therefore, this invention, by releasing a specific management unit not fully utilized for page allocation from allocation to the virtual volume and migrating the allocated pages belonging to this specific management unit to another management unit, makes the storage areas of the specific management unit available for write accesses for the other virtual volumes from the host computer.

Advantageous Effects of Invention

As mentioned above, this invention provides a storage system, a storage apparatus, and optimization methods of the storage areas of the storage system by which, even if the storage areas allocated to the virtual volume are managed in management units set by the RAID group, overhead for parity calculation does not become excessive.

Furthermore, according to this invention, even if the storage areas allocated to the virtual volume are managed in management units set by the RAID group, the storage areas in management units can be utilized efficiently. Furthermore, the deterioration of the response performance in response to the I/O from the host computer can be sufficiently eliminated.

BRIEF DESCRIPTION OF DRAWINGS

FIG. 4 shows an example of the page management table.

FIG. 5 is an example of the RAID group management table.

FIG. 6 is an example of the chunk management table.

FIG. 7 is an example of the management table for performing relocation such as releasing or newly allocating chunks from or to the virtual volumes.

FIG. 8 is an example of the table for managing chunks to be released for each virtual volume.

FIG. 14 is a flowchart showing the relocation processing in the disk occupation mode.

DESCRIPTION OF EMBODIMENTS

Figure 1:
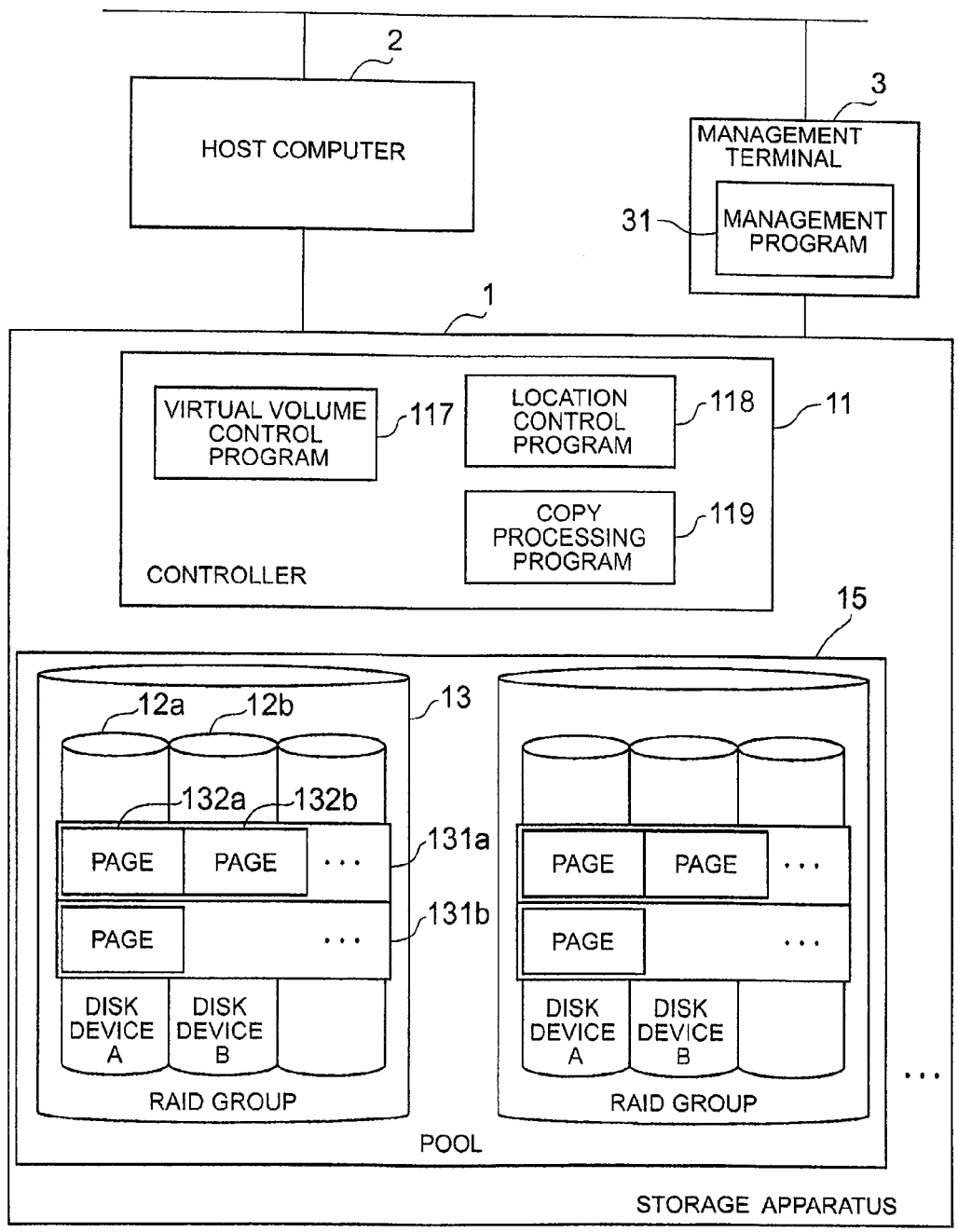
FIG. 1 is a hardware block diagram related to an embodiment of the storage system of this invention.

FIG. 1 is a hardware block diagram related to an embodiment of the storage system of this invention. The storage system comprises a storage apparatus 1 including disk arrays, a host computer 2 as a front-end device, and a management terminal 3.

The storage apparatus 1 is connected to the host computer 2, and is also connected to the management terminal 3. The host computer 2 is also connected to the management terminal 3 via a network.

Any type of network may be used; for example, an IP network such as a LAN or the like may be used.

The host computer 2 is a computer providing various types of services to the user. The host computer 2 comprises a network interface, a processor connected to the network interface, and a memory connected to the processor.

The memory stores application programs. The application programs are programs performed by the processor for the host computer 2 to provide services to the user.

The processor to perform the application programs, if necessary, issues access requests (data write requests or data read requests) to the storage apparatus 1.

The management terminal 3 is a computer which manages the computing system. The management terminal 3 comprises a network interface, a processor connected to the network interface, and a memory connected to the processor.

The memory in the management terminal 3 stores a management program 31. The management program 31 is a program performed by the processor for creating logical volumes, managing the storage apparatus 1, and performing a page relocation processing by the storage apparatus 1.

The storage apparatus 1 stores the data written by the host computer 2 in the storage device. The storage device exists in the computing system as a disk array comprising multiple disk devices 12. Reference signs 12a and 12b are respectively part of multiple disk devices 12. The disk devices 12 are storage devices such as magnetic disk drives, flash memories or others. A controller 11 performs write commands and read commands from the host computer 2 and accomplishes the data read/write processing for the storage device.

The controller 11 logically configures the physical storage areas included in the multiple hard disks as a RAID group, and provides the logical volumes to the host computer. Furthermore, the controller 11 manages one or multiple RAID groups 13 as a pool, as storage areas to be allocated to virtual volumes. One or multiple pools 15 exist in the storage apparatus.

Figure 2:
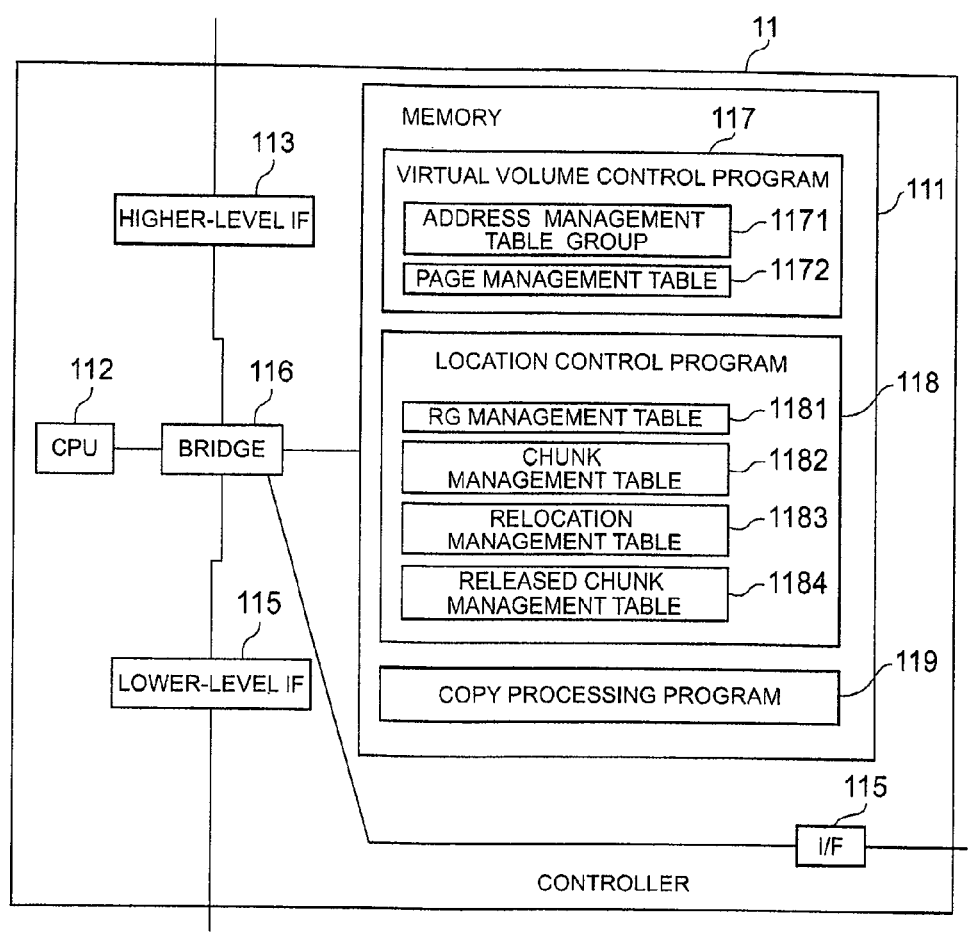
FIG. 2 is a hardware block diagram showing the details of a controller.

FIG. 2 is a hardware block diagram showing the details of the controller 11. The controller 11 comprises a memory 111, a CPU 112, a front-end interface (higher-level interface) 113, a back-end interface (lower-level interface) 114, an interface 115, and a bridge 116.

The memory 111 is a data storage device such as a semiconductor storage device. The memory 111 stores programs to be performed by the CPU 112 and the data and tables referred to by the CPU 112.

The memory 111 at least stores a virtual volume control program 117, a location control program 118, and a copy processing program 119.

The virtual volume control program 117 is a program performed by the processor 111 for controlling the virtual volumes and includes an address management table group 1171 and a page management table 1172.

The address management table group 1171 is a group of tables for managing the address correspondence of the virtual volumes to the disk devices 12, the RAID groups 13, and the pools 15. The page management table 1172 is described later with reference to FIG. 4.

The location control program 118 is a program performed by the processor for performing the management in locating pages in the RAID groups (hereinafter sometimes abbreviated as RGs).

The location control program 118 includes an RG (RAID group) management table 1181, a chunk management table 1182, a relocation management table 1183, and a released chunk management table 1184. These tables are described later with reference to FIGS. 5 to 8.

The copy processing program 119 is a program performed by the processor for controlling the copy processing accompanying the page migration to be described later.

The CPU 112 is a processor for performing each program stored in the memory 111. The front-end interface 113 is an interface for connecting the controller 11 to the host computer 2.

Note that page migration is disclosed by the Applicant in PCT/JP2009/058533 and PCT/JP2009/058593.

The back-end interface 114 is an interface for connecting the controller 11 to the disk devices 12. The back-end interface 114 is, for example, an SCSI adapter or an FC adapter.

The interface 115 is an interface for connecting the controller 11 to the management terminal 3. If the network connecting the controller 11 to the management terminal 3 is a LAN, the interface 115 is what is called a network interface card.

The bridge 116 mutually connects the memory 111, the CPU 112, the front-end interface 113, the back-end interface 114, and the interface 115, and controls the communication performed among these components.

Figure 3:
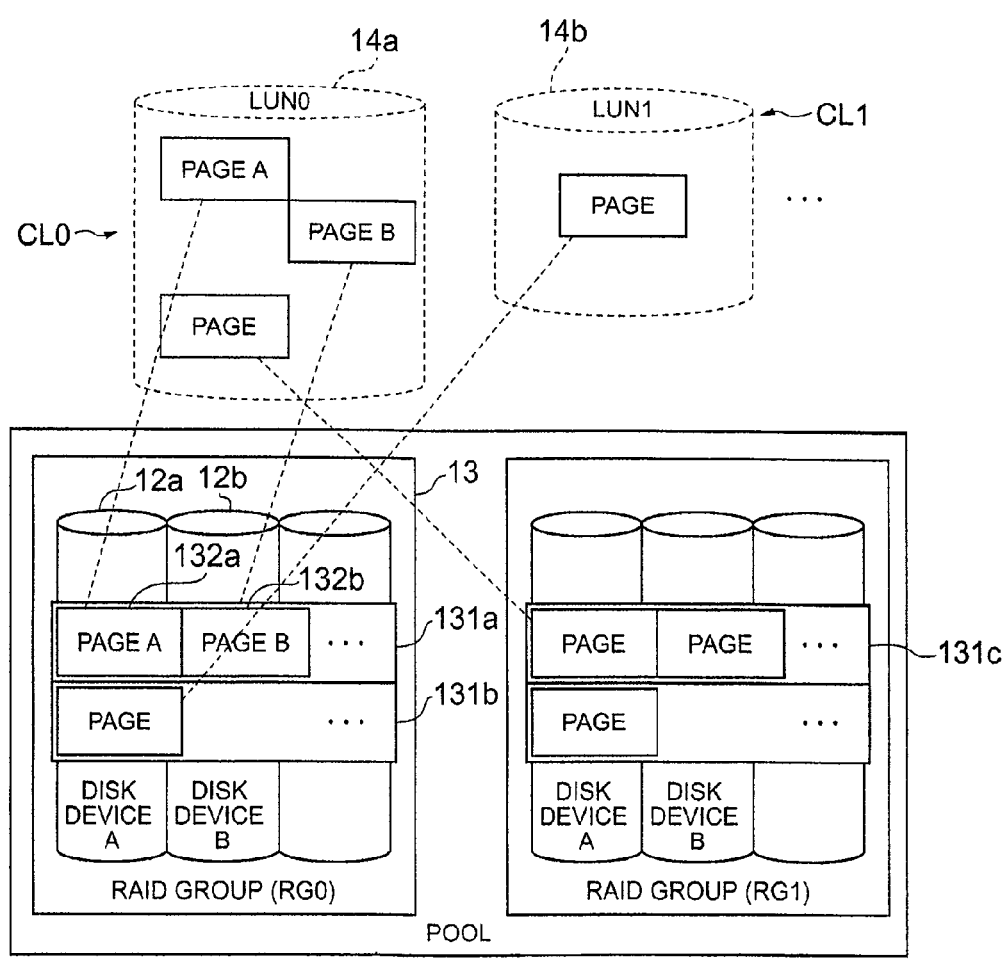
FIG. 3 is a function block diagram showing the relation between multiple virtual volumes and the storage areas of the storage device provided to the host computer by the storage apparatus 1.

FIG. 3 is a function block diagram showing the relation of multiple virtual volumes 14 (14a, 14b, . . . ) provided by the storage apparatus 1 to the host computer with the storage areas of the storage device. Multiple disk devices 12 comprise one RAID group 13, and multiple RAID groups 13 belong to one pool 15. In FIG. 3, a pool is defined by two RAID groups.

The virtual volumes are logical volumes whose storage capacity is virtualized and which do not have their own physical storage areas, and provide a virtual storage capacity to the host computer.

When the host computer makes a write access to the virtual volumes, the controller 11 allocates the specified pages from multiple pages of the RGs saved as a pool to the write areas of the virtual volumes. This allocation includes the correspondence of the block addresses of the virtual volumes to the block addresses of the pages, which is recorded in the address management table group 1171.

Multiple virtual volumes exist as LUN0 and LUN1. The multiple virtual volumes are made to correspond to the pool.

The multiple pages managed by the pool 15 are allocated to the virtual volumes 14 in units of chunks 131. The information equivalent to this allocation is registered in the page management table (FIG. 4), the RG management table (FIG. 5), and the chunk management table (FIG. 6).

The controller 11, with reference to this information, performs the specified control such as page allocation or, for a management table, registers or updates the information. The storage administrator, if the actual storage areas in the pool are insufficient, adds an RG 13 to the pool. The storage administrator adds storage apparatuses to the storage system as needed. The controller 11 manages the RAID groups 13 in divided multiple chunks 131.

The chunks 131 (131a, 131b, . . . ) comprise serial multiple pages 132 (132a, 132b, . . . ). One chunk is made to correspond to one virtual volume. The mixture of pages to be allocated to different virtual volumes existing in one chunk is thereby prevented.

If the mixture of pages to be allocated to multiple virtual volumes exists in one stripe, the processing for parity creation and others becomes complicated such as the processing for parity creation being performed across multiple controllers, and overhead which the controller receives will increase.

Therefore, the storage apparatus 1, as is clear from the chunk management table (FIG. 6), in accordance with the same stripe in the same RG, defines chunks comprising multiple pages, and allocates pages in units of chunks to a virtual volume.

The storage apparatus 1 manages chunks 131 in a specific size with reference to the stripes in the RG. That is, chunks are logical volumes (LDEVs) as a series of storage areas of the same parity.

In FIG. 3, the chunk 131a of the RG0 corresponds to the virtual volume (LUN0) 14a, the chunk 131b corresponds to the virtual volume (LUN1) 14b, and the chunk 131c of the RG1 corresponds to the virtual volume (LUN0) 14a.

Accesses from the host computer to the virtual volume 14a are processed by a controller CL0, and accesses to the virtual volume 14b are processed by a controller CL1.

Note that the storage apparatus 1 may also be permitted to set the controllers in charge to process I/O from the host computer in units of chunks. For example, the controller CL0 is allocated to the chunk 131a of the virtual volume 14a, and the controller CL1 is allocated to the chunk 131b. In this case, multiple pages in one chunk may also be allocated to respective different virtual volumes.

If the management terminal 3 changes the definition of the chunk management table (FIG. 6), the correspondence of the chunks to the virtual volumes can be changed. As the pool 15 is set by the virtual volume (LUN0) 14a and the virtual volume (LUN1) 14b, the different controllers share the single pool.

Virtual volumes 14 are storage areas provided by the storage apparatus 1 to the host computer 2. The controller 11, in accordance with the data written from the host computer 2 to a virtual volume, selects unallocated pages from the chunks allocated to this virtual volume, and allocates the pages to the write areas of this virtual volume. The storage areas of the virtual volume 14 are made to correspond to the pages 132. In the initial status, all the areas of the virtual volume are allocated to one page for the initial setting (for example, a page in which all bits are composed of 0).

The storage apparatus 1 stores the data in the unallocated pages in the chunks, and updates the mapping of the storage areas of the virtual volume 14 and the pages 132. This update is accomplished by the controller 11 updating the information of the page management table (FIG. 4) and the chunk management table (FIG. 6).

The pages allocated to the write access areas in the virtual volume are managed as allocated pages by these page management tables. The storage apparatus 1, if there are no more unallocated pages left in the chunks allocated to the virtual volume, allocates unallocated chunks in the pool 15 to this virtual volume. At this time, the controller 11 registers the correspondence of the virtual volume and the RG-chunk in the chunk management table (FIG. 6). Unallocated chunks are managed by the used chunks.

The chunks allocated to the virtual volume are registered in the chunk management table (FIG. 6) as the in-use chunks. It is preferable to select chunks to be newly allocated to the virtual volume from multiple RGs equally. By this method, the storage apparatus 1 can distribute the load among respective RGs.

If the host computer 2 requires data deletion of the storage apparatus and in other cases, the page corresponding to the logical address (of the virtual volume) of the data to be deleted is released from the allocation to the virtual volume and becomes an unallocated page. Page or chunk release is accomplished by the deletion of the entry in the management table by the controller 11 or the registration as an unallocated page or an unallocated chunk.

The unallocated page or unallocated chunk is used for the writing of new data into the virtual volumes. The storage apparatus 1, if releasing all pages in the chunk, classifies this chunk as an unused chunk released from the allocation to the virtual volume.

Though pages are released as needed, if even one allocated page exists in the chunk, the storage apparatus cannot release the chunk itself. If a large number of chunks of this type exist, even if an unused page unallocated to these chunks exists, this unused page cannot be used for the allocation to the virtual volumes other than the virtual volume to which the chunk corresponds. This causes a problem in that the utilization efficiency of the storage areas will deteriorate and that, as the number of pages cannot be equalized among the multiple RGs, the processing performance of the I/O from the host computer will deteriorate.

Therefore, the relocation control program of the controller 11, by migrating the used pages of a specific chunk to the unallocated areas of the used chunk, releases the used pages of the specific chunk, creates the specific chunk as an empty chunk not including any used pages, and releases this empty chunk from the allocation to the virtual volume. Note that the controller 11, when migrating a used page, migrates this page to the chunk whose allocation destination virtual volume is the same.

Figure 15A:
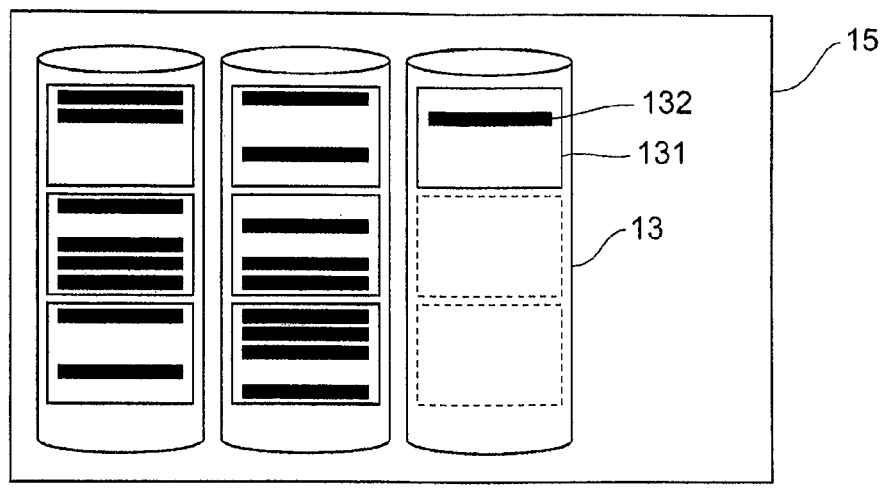
FIG. 15A is a block diagram showing the pool status before page migration in the storage system shown in FIG. 1.
Figure 15B:
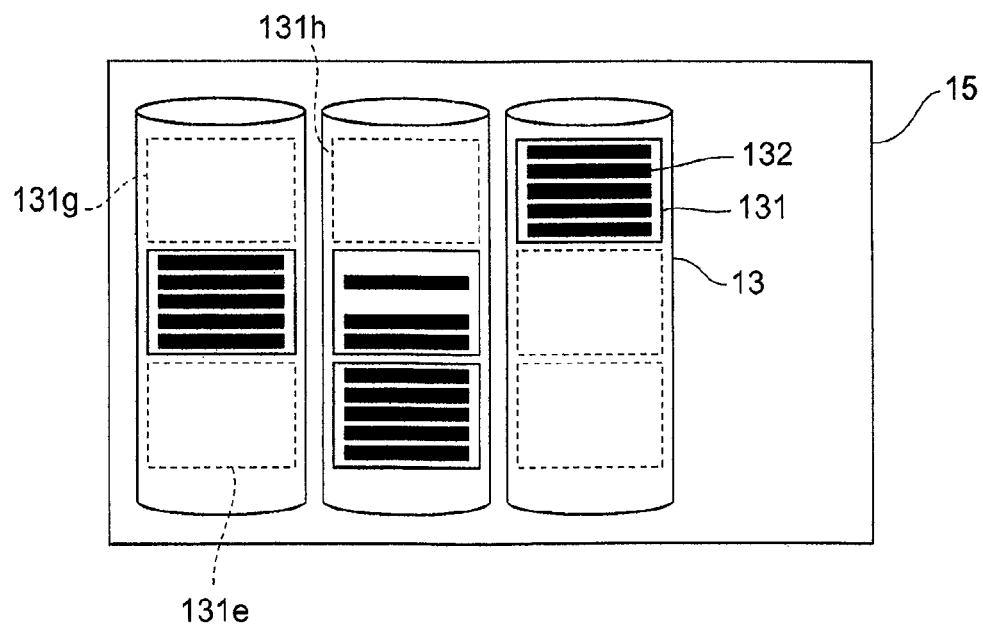
FIG. 15B is a block diagram showing the pool status after page migration in the storage system shown in FIG. 1.

FIG. 15A and FIG. 15B are block diagrams showing the pool status before and after page migration. As mentioned above, reference sign 13 indicates an RG, reference sign 15 indicates a pool, reference sign 131 indicates a chunk, and reference sign 132 indicates a used page. FIG. 15A shows the status before page migration and FIG. 15B shows the status after page migration.

The comparison of FIG. 15A and FIG. 15B shows that the chunks 131*e*, 131*h*, 131*g* include used pages in the beginning and, by migrating the used pages to the other used chunks, are released as unused chunks.

As the controller 11 rebalances (relocates) the used pages in the pool, the allocation of used pages to all of the multiple RGs is equalized. The I/O rate for the multiple RGs becomes of the same degree and, even if the storage apparatus allocates the pages to the virtual volumes in accordance with the chunks, the processing performance of the storage apparatus for accesses from the host computer can be appropriately maintained.

Figure 16A:
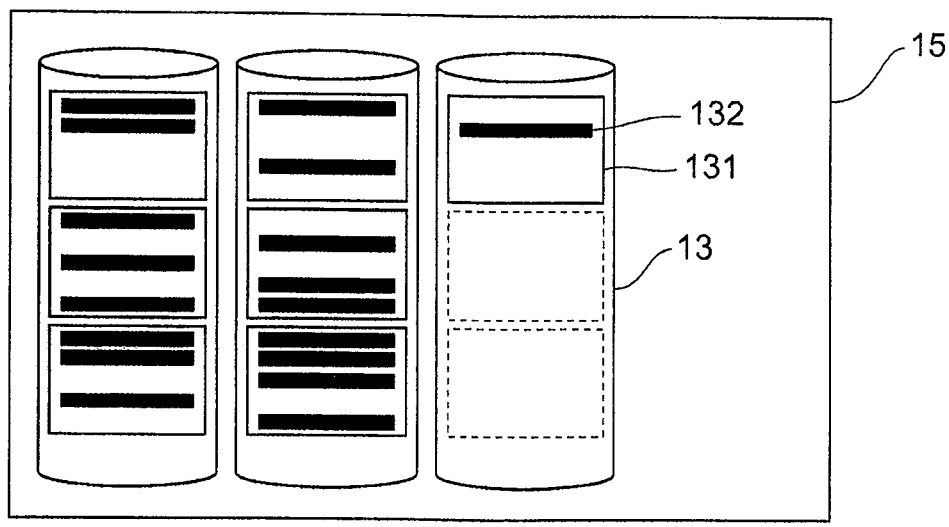
FIG. 16A is a block diagram showing the pool status before page migration in a comparison example.
Figure 16B:
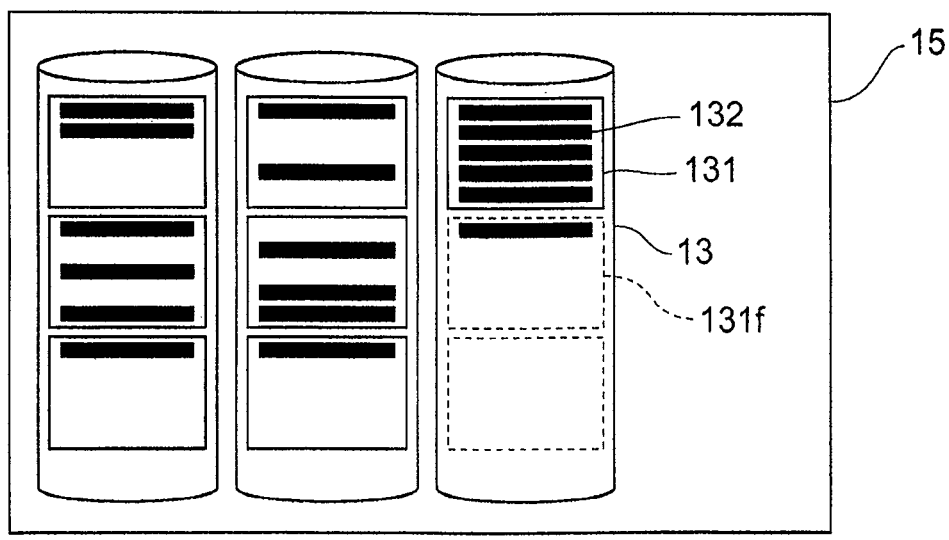
FIG. 16B is a block diagram showing the pool status after page migration in a comparison example.

FIG. 16A and FIG. 16B relate to a comparison example. When the controller migrates the used pages, as chunk release is not considered, page rebalance is accomplished after page migration (FIG. 16B) better than before page migration (FIG. 16A), but the number of used chunks is larger (131*f*), which deteriorates the storage area efficiency.

FIG. 4 shows an example of the page management table 1172. The Chunk ID shows the identifiers for identifying chunks, and the page ID shows the identifiers for identifying pages. Class shows the page classes. For example, the pages for storing index information and metadata are classified as Index, and the pages for storing data are classified as Data.

Page Priority indicates the levels of importance of the pages, and a larger number indicates a higher importance. Status indicates the page statuses, including Allocated, Unallocated, and Formatting.

The storage apparatus 1 or the management terminal 3 determines the page priority with reference to the page class and the access frequency. For example, to the page storing index information, metadata, and others, due to the higher importance of these than for normal data, 5 for the highest priority is given.

Among normal data, 3 is given to frequently accessed pages while 1 is given to less frequently accessed pages. Meanwhile, 0 is given to unallocated pages. It may also be permitted to give the same level of priority to multiple pages. As mentioned above, as a certain level of priority is given to each page, pages to be migrated can be determined while preventing the performance deterioration of the pages of the higher priority as much as possible. That is, as the storage system attempts to save the pages (chunks) of higher priority and release the remaining pages of lower priority, it becomes more probable that the pages of higher priority do not have to be migrated.

The page priority becomes the factor for determining the chunk priority. The chunk priority is the factor for determining the chunks to be released.

FIG. 5 is an example of the RG management table. This management table manages the number of chunks and pages in respective RGs for each virtual volume. Virtual Volume shows the identifiers for identifying virtual volumes, and RAID Group shows the identifiers for identifying the RAID groups.

Chunk Size shows the capacity of one chunk. Page Size shows the capacity of one page. Used Chunks shows the number of chunks allocated to the virtual volumes for each virtual volume and for each RG. Total Allocated Pages shows the total number of allocated pages for each RG allocated to the virtual volumes.

FIG. 6 is an example of the chunk management table. The chunk management table manages the number of pages in respective chunks and priority for each virtual volume and RG. Virtual Volume shows the identifiers for identifying virtual volumes, RAID Group shows the identifiers for identifying the RGs, Chunk ID shows the identifiers for identifying the chunks, and Allocated Pages shows the number of allocated pages in the chunks.

Unallocated Pages shows the number of unallocated pages in the chunks. In the example of this table, the number of pages in one chunk should be 5. In the actual environment, the number of pages in one chunk sometimes can be several thousand or more.

Chunk Priority shows the levels of priority of chunks, and a larger number shows a higher priority. Chunk Priority is, for example, determined with reference to the priority of the pages belonging to the chunk. The total value of the priority levels of the multiple pages belonging to the chunk should be the priority of the chunk.

FIG. 7 is an example of the management table for performing chunk relocation (relocation management table) for virtual volumes such as release, new allocation, and others. Virtual Volume shows the identifiers for identifying virtual volumes, and RAID Group shows the identifiers for identifying the RGs.

Mode shows the type of relocation method (described later) and the characteristic whether the trigger for performing the relocation is automatic or manual. Saved Chunk shows the IDs of the chunks to be maintained in the corresponding RGs without being released for the virtual volumes. Deficient Number of Chunks shows the number of chunks required to be newly allocated from the RGs to the corresponding virtual volumes.

FIG. 8 is an example of the table for managing chunks to be released (released chunk management table) for each virtual volume. The chunks to be released are registered in the management table. The pages belonging to the chunks to be released become the pages to be migrated to the other chunks.

As shown in FIG. 8, Virtual Volume shows the identifiers for identifying virtual volumes, Chunk ID shows the identifiers for identifying the chunks, Allocated Pages shows the number of allocated pages in the chunks, Unallocated Pages shows the number of unallocated pages in the chunks, and Chunk Priority shows the levels of priority of chunks.

In FIG. 4, items for Chunk ID and others are registered by the virtual volume control program 117. In FIG. 5, the correspondence of the virtual volumes to the RGs, the chunk sizes, and the page sizes are registered by the virtual volume control program 117, and the other items are registered by the location control program 118.

In FIG. 6, the correspondence of the virtual volumes to the RGs, and the chunk IDs are registered by the virtual volume control program 117, and the other items are registered by the location control program 118.

In FIG. 7, the correspondence of the virtual volumes to the RGs and the chunk IDs of saved chunks are registered by the virtual volume control program 117, and the other items are registered by the location control program 118.

In FIG. 8, the correspondence of the virtual volumes to the chunk IDs is registered by the virtual volume control program 117, and the other items are registered by the location control program 118.

Figure 9:
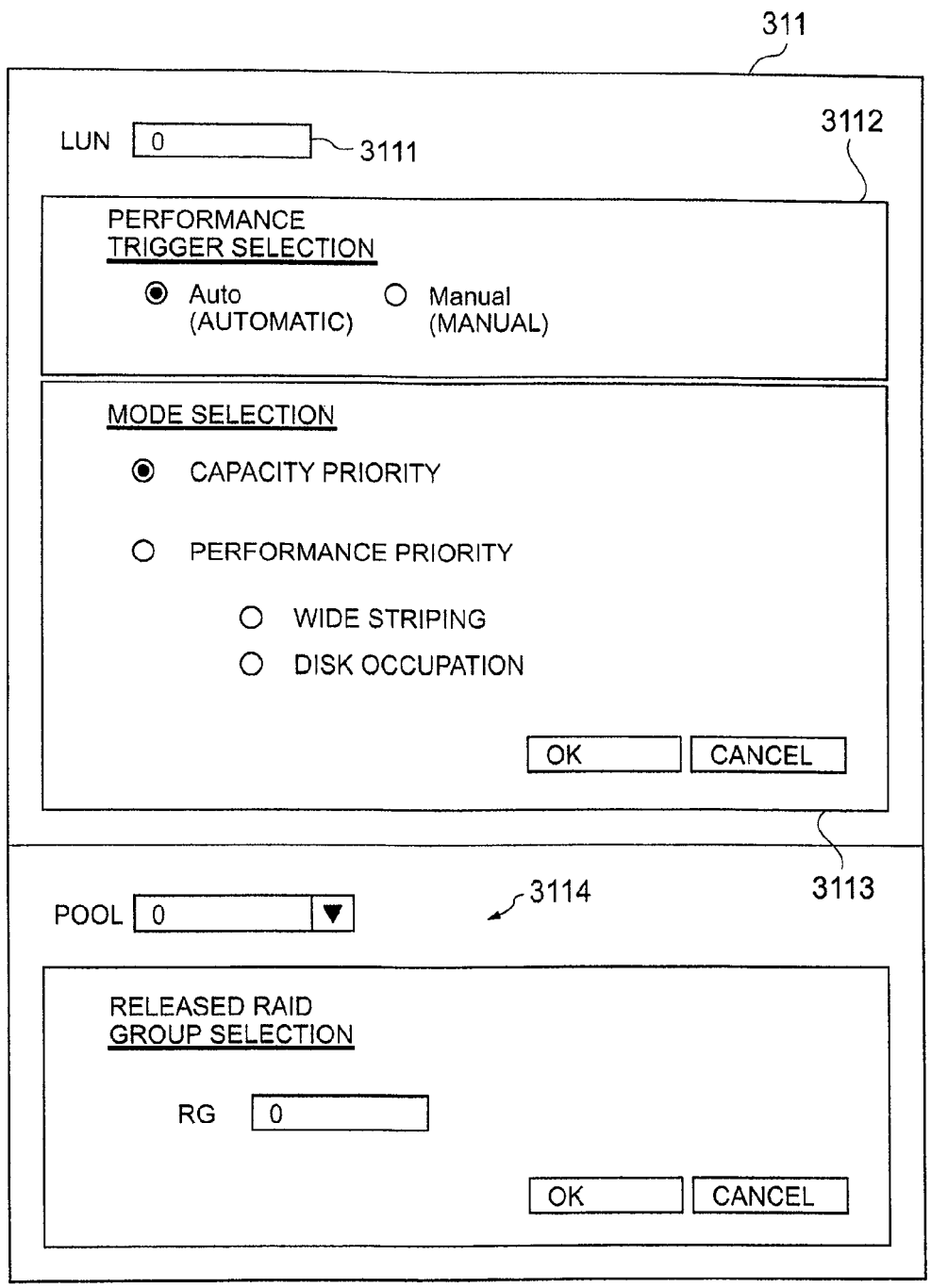
FIG. 9 shows an example of the setting screen provided to the administrative user and the administrative client by the management terminal.

FIG. 9 shows an example of the setting screen 311 provided to the administrative user and the administrative client by the management terminal 3. The administrative user, by using the setting screen 311, sets the control information for releasing chunks for the location control program 118 of the controller 11.

The setting screen 311 comprises the LUN setting unit 3111, the performance trigger selection unit 3112, the mode selection unit 3113, and the released RAID group selection unit 3114. The LUN setting unit 3111 is a setting unit for specifying the LUN (Logical Unit Number) of a virtual volume 14. This setting unit is for setting the virtual volume as the target for which the chunk release is performed.

The performance trigger selection unit 3112 is a setting unit for selecting whether to make the performance trigger for chunk release and the release processing for page relocation performed along with chunk release automatic or manual.

The above-mentioned trigger includes the unequal number of chunks (described later) and the decrease of unused chunks. The cases that may cause the unequal number of chunks include the addition of pool volumes, the capacity reduction of virtual volumes, the de-duplication of pages, and others. Furthermore, chunk release may also be triggered by page rebalance.

The mode selection unit 3113 is a setting unit for the administrative user to select the mode of the release processing. Normally, the administrative user should select the capacity priority mode for intending the efficient utilization of storage capacity.

Meanwhile, if the host computer utilizes the storage apparatus as a database and in other cases where the performance of the storage apparatus is desired to be prioritized, the administrative user should select the performance priority mode.

The performance priority mode includes even more detailed settings. For example, when intending to achieve the high performance equally in multiple virtual volumes, the administrative user should select the wide striping mode.

In other cases, for inhibiting the performance of a certain virtual volume from being affected by another virtual volume 14, the administrative user should select the disk occupation mode.

The performance of a virtual volume indicates the processing performance of the storage apparatus for the I/O from the host computer to this virtual volume.

The above-described settings can be specified for each virtual volume. Furthermore, for simplifying the operation, it may also be permitted to provide an interface for specifying the settings in units of pools collectively. It may also be permitted to add other alternatives.

Next, the released RAID Group selection unit 3114 is described below. This is used by the administrative user to select the RG to which to apply the release processing.

The administrative user specifies the pool ID and the ID of the RG belonging to the pool. When the administrative user specifies the RG, the release processing can be applied to all chunks belonging to the RG.

Figure 10:
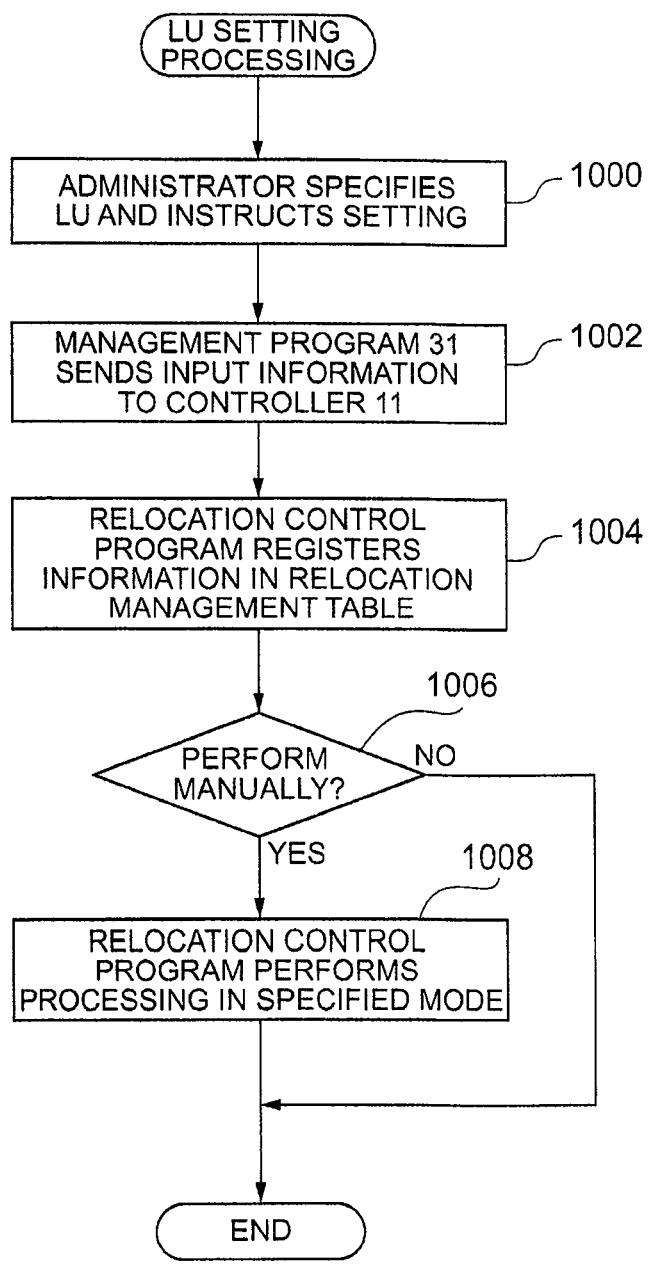
FIG. 10 is a flowchart showing the LU setting processing.

FIG. 10 is a flowchart showing the LU setting processing. The administrative client specifies the LUN and selects the performance trigger and the mode (1000).

The management program 31 sends the input and selected information to the controller 11 of the storage apparatus 1 (1002). The location control program 118 of the controller 11 registers the received information to the relocation management table 1183 shown in FIG. 7 (1004). As more specifically described, the information showing whether the performance trigger is automatic or manual and the information showing the relocation mode is registered.

The location control program 118 determines whether the performance trigger is automatic or manual (1006) and, if it is manual, performs the relocation processing in the specified mode (1008) or, if the trigger is determined to be automatic, terminates the setting processing temporarily and performs the relocation processing later at the appropriate timing.

The appropriate timing indicates, for example, a case where the location control program refers to the RG management table regularly, and the number of used chunks or the total number of allocated pages becomes unequal among virtual volumes. The used chunks indicate the chunks allocated to the virtual volumes before page allocation.

Figure 11:
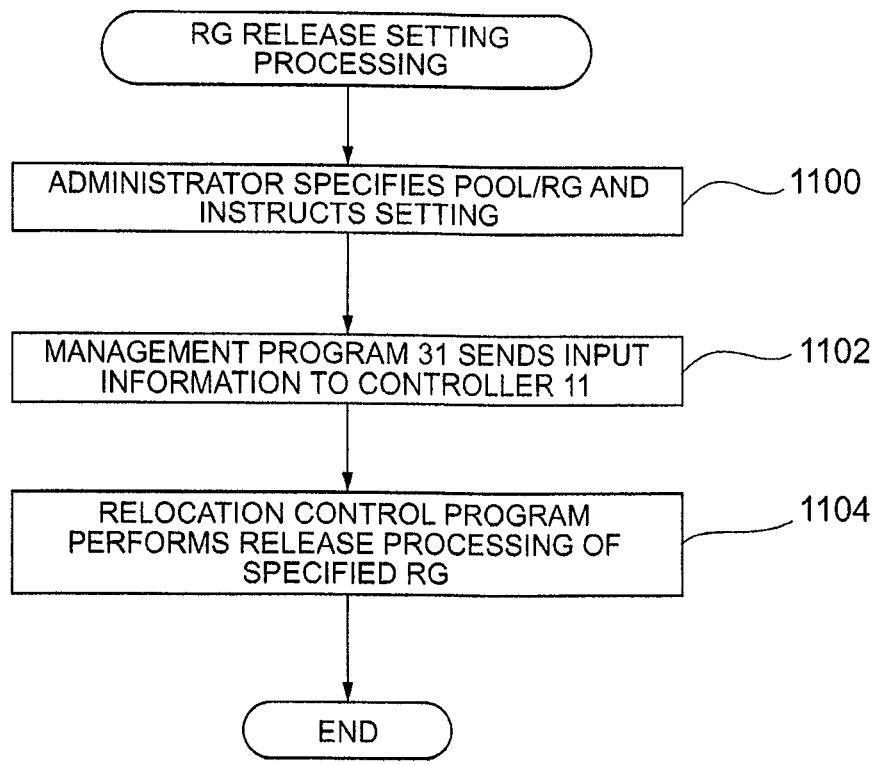
FIG. 11 is a flowchart showing the processing performed by the management terminal for setting page migration or chunk release in the storage apparatus.

FIG. 11 is a flowchart showing the processing performed by the management terminal 3 for setting page migration or chunk release (RG release setting processing) in the storage apparatus 1. The administrative user specifies the pool ID and the RG for the management program 31 and instructs the setting processing (1100). The management program 31 sends the input and selected information in the management terminal 3 to the controller 11 of the storage apparatus 1 (1102). The relocation control program performs release processing of the specified RG.

Then, the location control program 118 of the controller 11 registers the pool ID and/or the RG ID in the RG management table (FIG. 5), the chunk management table (FIG. 6), and the relocation management table (FIG. 7), and performs the release processing for the specified RG.

Figure 12:
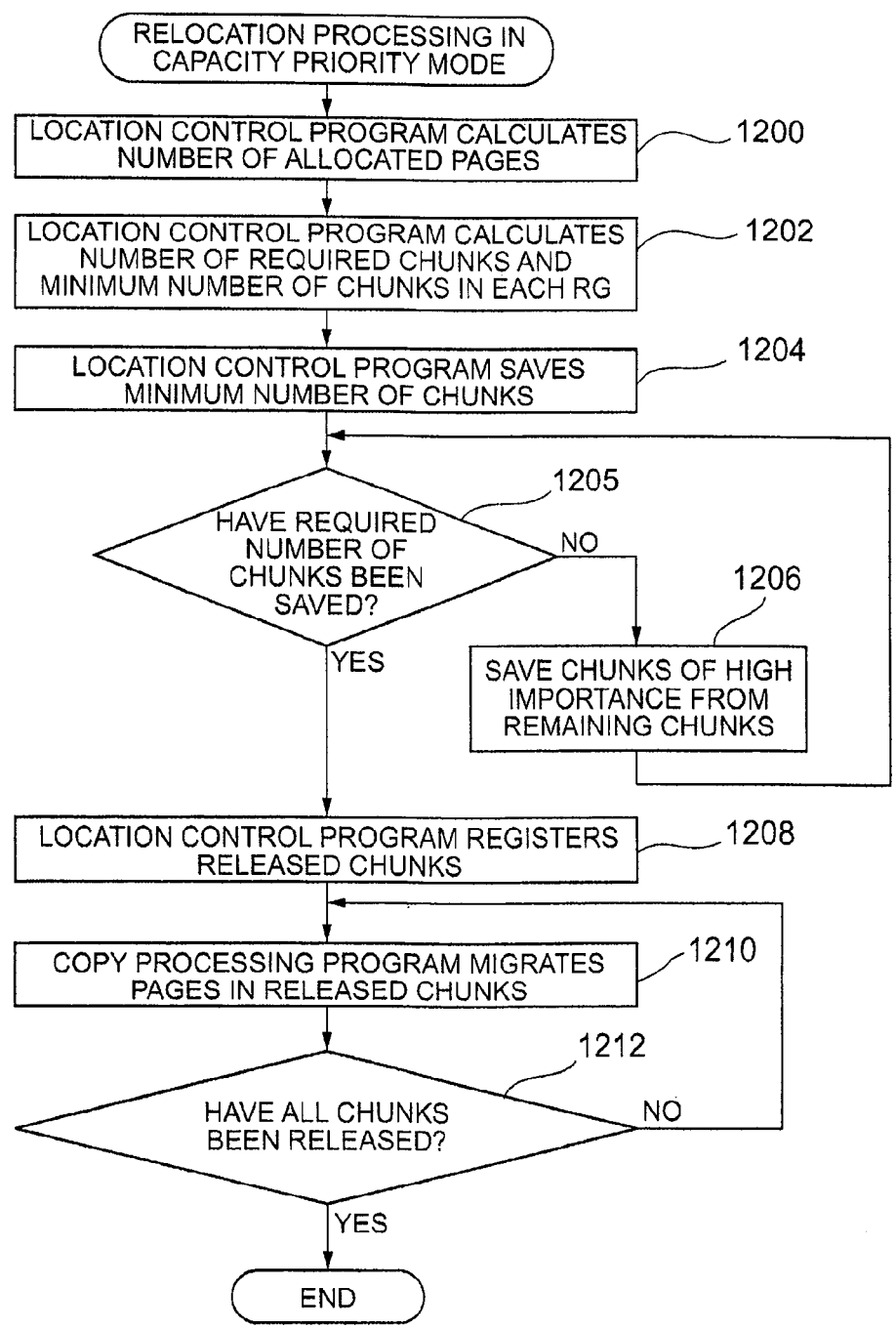
FIG. 12 is a flowchart showing the relocation processing in the capacity priority mode.

FIG. 12 is a flowchart showing the relocation processing in the capacity priority mode. Capacity Priority is the mode in which, in the pool 15, the number of chunks allocated to the virtual volumes or the capacity of the same is reduced to the minimum.

The location control program 118 refers to the chunk management table (FIG. 6) managing the chunks in the pool, and calculates the total capacity of the allocated pages of the multiple virtual volumes registered in the chunk management table (1200). These multiple virtual volumes are hereinafter referred to as target virtual volumes.

Note that the storage apparatus 1 may also be permitted to apply the relocation processing in the capacity priority mode for one or multiple target virtual volumes. The embodiment of the chunk release processing includes, for example, specifying pools as well as specifying virtual volumes. The location control program 118, by dividing the calculated page capacity by the average value of the chunk sizes, calculates the number of chunks required for page allocation, and then, by dividing the number of required chunks by the number of RGs belonging to the pool, calculates the minimum number of chunks in each RG (1202). Note that the page capacity is calculated with reference to the size of each page and the amount of page allocation. The location control program 118 should calculate the number of required chunks with reference to the average value of the chunk sizes and saves the number but, subsequently, may also be permitted to review and confirm each chunk size and add chunks if the number is insufficient or reduce chunks if the number is larger than required.

The location control program 118 refers to the chunk management table shown in FIG. 6 and, for each RG, selects the minimum required number of chunks of high priority, for example, selects the chunks of high priority from the chunks including a large number of allocated pages (1204).

That is, if the level of priority is the same, the chunk of the highest priority is saved. Then, the ID of the saved chunk is registered in the relocation management table (FIG. 7) as a saved chunk.

The location control program 118, if determining the presence of an RG which does not satisfy the minimum number of chunks (1205), registers the deficient number of chunks in the deficient number of chunks field of the relocation management table (FIG. 7).

The location control program 118, by referring to the relocation management table as needed, confirms the deficient number of chunks, confirms the IDs of the chunks not satisfying the minimum number of chunks and, from the remaining used chunks of these chunks, saves the chunks of high importance as the chunks to be maintained without being released (1206).

Next, the location control program 118 updates the deficient number of chunks in the relocation management table (FIG. 7) to 0. By this method, the minimum number of chunks is saved to each RG. The chunk IDs of the saved chunks are recorded as the saved chunks of the relocation management table.

An example of the step 1206 is more specifically described below. The location control program 118, if there is a fraction number in the minimum number of chunks, saves the number of chunks of which the figures after the decimal point are rounded down as the number of required chunks. For example, if the calculated value of the minimum number of chunks is 4.7, the figure after the decimal point is rounded down and the minimum number of chunks is specified as 4.

Next, the location control program 118 determines whether the total value of the minimum number of chunks of all the respective RGs satisfies the number of required chunks for the target virtual volume or not (returns to 1205).

The location control program 118, if this is determined to be affirmative, proceeds to the next step (1208). However, as mentioned above, if the number of required chunks is estimated to be smaller than it actually is as the decimal fractions are rounded down, the location control program 118 determines it to be negative.

The location control program selects the chunks for covering the deficiency from the chunks other than the saved chunks. The location control program prioritizes the RGs including fewer saved chunks and selects the chunks of higher importance sequentially from the multiple RGs, preventing the duplication of the same RGs. When the chunks for covering the deficiency are selected, processing for saving the minimum number of chunks is completed. The location control program 118 records the IDs of the selected chunks as the saved chunks in the relocation management table (FIG. 7).

Next, the location control program 118 registers the IDs of the used chunk not recorded in the location management table (FIG. 7) as a saved chunk in the released chunk management table (FIG. 8) (1208). This chunk is the chunk to be released from allocation to the virtual volumes and, for convenience, this is hereinafter referred to as a released chunk.

The copy processing program 119 refers to the released chunk management table (FIG. 8) and migrates the pages in the registered chunks to the unallocated pages in the saved chunk (1210). The location control program 118, when completing the migration of all the pages in the released chunk, deletes the entry of this chunk from the released chunk management table (FIG. 8).

The released chunk is connected to a free queue and, subsequently, the virtual volume control program 117 uses this released chunk for the allocation to the virtual volumes. The same method is applied to page allocation. Page allocation is performed by the virtual volume control program 117.

Page migration is performed by the copy processing program 119 as a result of copying the data of the migration source volume to the migration destination volume and releasing the migration source pages from the allocation to the virtual volumes.

The copy processing program 119 refers to the released chunk management table each time a page is migrated, and determines whether the entries of all released chunks that were registered are deleted from the released chunk management table or not, that is, whether the processing for all the released chunks is completed or not. If this is determined to be affirmative, this series of processing is completed. If not, the page migration processing is repeated for the released chunks registered in the management table.

The location control program 118, as for the released chunks, determines whether all used pages are released from the allocation to the virtual volumes or not and, if this is determined, deletes the entries of the released chunks in the released chunk management table (FIG. 8).

The flowchart shown in FIG. 12 enables the improvement of the I/O processing performance by solving the unequal page location for each RG and the improvement of the efficiency of the storage capacity by releasing excessive chunks.

Note that, though the description of FIG. 12 rounds down the decimal fractions of the minimum number of chunks, rounding up may also be permitted. At this time, though the total number of the minimum number of chunks in respective RGs exceeds the number of required chunks in the virtual volumes, the location control program registers the excessive chunks to the released chunk setting table as the released chunks. The location control program sets the chunks including fewer allocated pages and of the lower levels of priority as released chunks.

Figure 13:
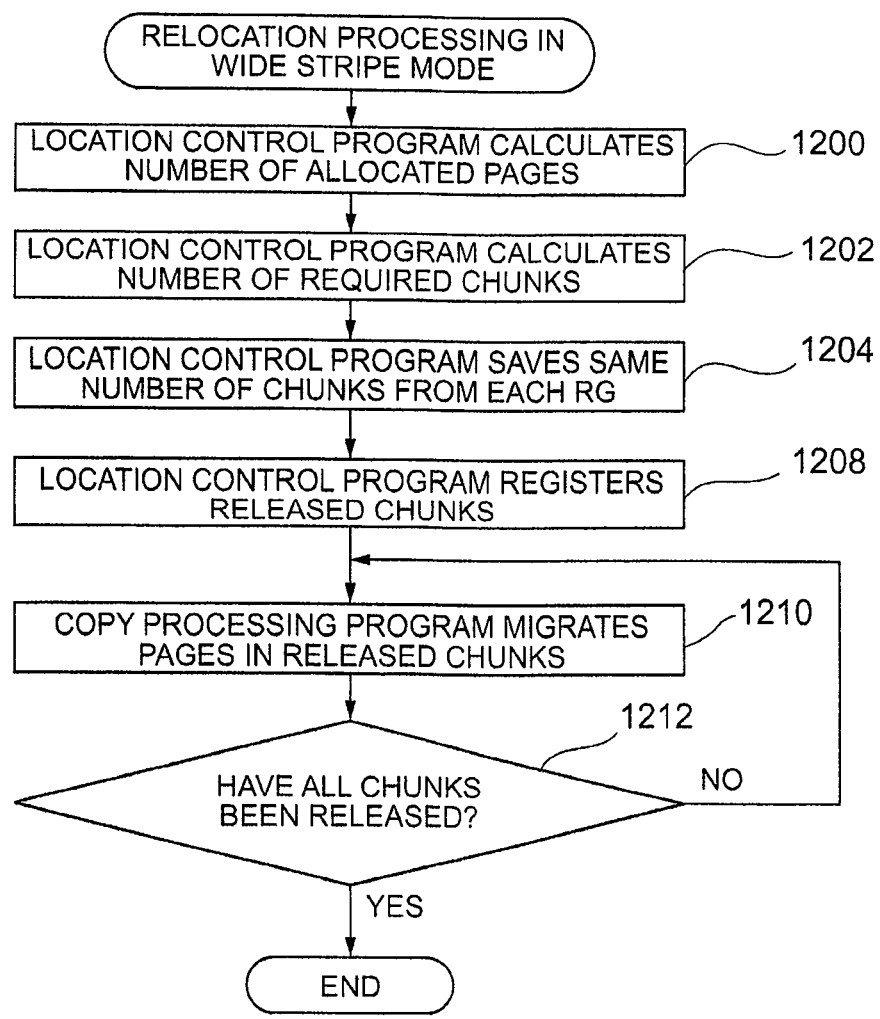
FIG. 13 is a flowchart showing the relocation processing in the wide striping mode.

FIG. 13 is a variation example of FIG. 12 and is a flowchart showing the relocation processing in the wide striping mode. The wide striping mode is the mode intended for reducing overhead of the storage apparatus performing the page relocation processing accompanying chunk release.

What is different from the flowchart in FIG. 12 is that in the embodiment in FIG. 12, if there is a decimal fraction in the minimum number of chunks, the relocation program rounds down the value to be the minimum number of chunks and saves the deficient number of chunks from the used chunks while FIG. 13 shows the process in which the fraction below the decimal point is rounded up by which, for each of the multiple RGs, the equal number of chunks exceeding the minimum number of chunks is saved.

That is, the flowchart in FIG. 13 can reduce overhead of the controller as much as the steps (1205, 1206) existing in the flowchart of FIG. 12 due to the necessity for newly saving the chunks for the fraction can be deleted.

Meanwhile, the embodiment in FIG. 13 does not release the allocation of the chunks exceeding the number of required chunks to the virtual volumes and, therefore, falls short of the embodiment in FIG. 12 regarding the efficient utilization of the storage capacity.

FIG. 14 is a flowchart showing the relocation processing in the disk occupation mode. This mode is intended for reducing overhead of the release processing by making the correspondence of a specific virtual volume to a specific RG, releasing this RG from the allocation to the other virtual volumes, and keeping the RG from being affected by the relevant other virtual volumes.

The location control program 118 refers to the chunk management table and calculates the total number of allocated pages of all the virtual volumes entered in the chunk management table (1400).

Next, the location control program calculates the number of required chunks with reference to the calculated number of pages (1402). The location control program refers to the chunk management table and selects the RG including a large number of allocated pages for a specific virtual volume. If there are RGs with the same number of allocated pages, the RG of the highest level of priority is selected (1404).

The location control program 118 saves the number of required chunks for the selected RG (1406). At this time, the chunk with a large number of allocated pages is selected. If there are chunks with the same number of allocated pages, the chunk with the higher level of priority is selected. The saved chunk is registered in the saved chunks field of the relocation management table (FIG. 7).

Furthermore, the location control program 118, if determining that the number of the in-use chunks of the selected RG is less than the number of required chunks, registers the deficient number of chunks in the deficient number of chunks field of the relocation management table, and allocates as many chunks as the deficient number of chunks from the same RG. When the allocation of the deficient number of chunks is completed, the deficient number of chunks in the relocation management table (FIG. 7) is updated to 0. By this method, as many chunks as the number of required chunks are saved for the RG.

The location control program 118, if determining that the number of in-use chunks exceeds the number of required chunks, registers the chunks not saved from among the in-use chunks in the released chunk management table (FIG. 8). Furthermore, the location control program 118 registers the chunks of the other RGs which were not selected in the released chunk management table as the chunks to be released (1208).

The copy processing program 119 refers to the released chunk management table (FIG. 8) and migrates the pages in the registered chunk to the unallocated pages in the saved chunk (1410). The location control program 118, when completing the migration of all the pages in the released chunk, releases this chunk and deletes the entry of the chunk from the released chunk management table.

The location control program 118 refers to the released chunk management table (FIG. 8), and determines whether the release of all the registered chunks is completed or not (1412). If no entry exists in the released chunk management table, the release is determined to be completed. If not completed, the same processing is repeated for the remaining released chunks.

Next, the location control program 118, if referring to the chunk management table (FIG. 6) and determining that a chunk allocated to the other virtual volume exists in the selected RG, registers this chunk to the released chunk management table (FIG. 8) as the chunk to be released (1414).

The location control program 118 specifies the chunk allocated to the other virtual volume and existing in the selected RG as a released chunk (1414). The location control program 118 saves the chunk to which the pages of the released chunk are migrated in the other RG as a required chunk.

As mentioned above, as the pages of a specific RG are exclusively allocated to a specific virtual volume, the storage apparatus, by inhibiting the specific virtual volume from being affected by the other virtual volumes, can maintain and improve the I/O processing efficiency for the specific virtual volume.

[Industrial Applicability]

This invention, by releasing a specific management unit not fully utilized for page allocation from allocation to the virtual volume and migrating the allocated pages belonging to this specific management unit to another management unit, makes the storage areas of the specific management unit available for the write accesses for the other virtual volumes from the host computer, and therefore, can be utilized for optimizing the storage areas of the storage system and the storage apparatus.

The invention claimed is:

1. A storage system for processing one or more write accesses from a computer, comprising:

a storage device comprising a storage area for storing write data associated with the one or more write accesses;

a controller for managing the storage area of the storage device as one or more pools, one or more RAID groups included in each of the one or more pools, a plurality of first logical areas included in each of the one or more RAID groups, and a plurality of second logical areas configuring each of the plurality of first logical areas according to a first mode and a second mode, where the controller provides a plurality of virtual volumes to the computer, causes one of the plurality of first logical areas included in the one or more RAID groups of at least one of the one or more pools to correspond with a destination virtual volume of the write access when each write access is received from the computer, and allocates one or more of the plurality of second logical areas, belonging to at least one of the plurality of first logical areas that was caused to correspond with the destination virtual volume of the write access, to an area into which data of the destination virtual volume is to be written;

a first interface for coupling the computer;

a second interface for coupling the storage device; and a control memory for storing:

first control information for managing the plurality of first logical areas;

second control information for managing the second logical areas; and third control information for establishing a correspondence relationship between the plurality of first logical areas and the plurality of virtual volumes, wherein the controller comprises:

a first processing unit for determining the first logical area corresponding to the destination virtual volume of the write access by using the third control information when the write access is received, and allocating one or more of the second logical areas belonging to the at least one of the plurality of first logical areas to the area into which the data of the destination virtual volume is to be written;

a second processing unit for releasing at least one of the plurality of the first logical areas, that was caused to correspond with at least one of the plurality of virtual volumes, from the at least one of the virtual volumes with which the one of the plurality of first logical areas is in the correspondence relationship, the second processing unit determining each degree of importance regarding the at least one of the plurality of the first logical areas and releasing the at least one of the plurality of the first logical areas, starting from a first logical area with a lowest degree of importance, based on the determination result; and a third processing unit for migrating, upon releasing the at least one of the plurality of first logical areas, data stored in the one or more allocated second logical areas belonging to one or more of the first logical areas to be released, to another one or more second logical areas belonging to another one or more first logical areas, and releasing the one or more allocated second logical areas from one or more virtual volumes with which the one or more allocated second logical areas are in the correspondence relationship, wherein the controller releases the at least one of the plurality of the first logical areas according to the first mode or the second mode, and a number of the first logical areas included in the one or more RAID groups which correspond with each of the virtual volumes and which maintain correspondence without being released is different in the first mode and in the second mode.

2. The storage system according to claim 1, further comprising:

an external interface for specifying the second processing unit to perform releasing of the at least one of the plurality of the first logical areas according to the first mode or the second mode.

3. The storage system according to claim 1, wherein in the first mode, the number of the first logical areas included in the one or more RAID groups which correspond with each of the virtual volumes and which maintain correspondence without being released are minimized across the one or more RAID groups.

4. The storage system according to claim 1, wherein in the second mode, the number of the first logical areas included in the one or more RAID groups which correspond with each of the virtual volumes and which maintain correspondence without being released are equalized across the one or more RAID groups.

5. The storage system according to claim 1, wherein in the second mode, the number of the first logical areas included in the one or more RAID groups which correspond with each of the virtual volumes and which maintain correspondence without being released are consolidated to one of the one or more RAID groups.

6. A method of managing a storage area of a storage device, the storage area for storing write data associated with one or more write accesses from a computer, the method comprising:

managing the storage area as one or more pools, one or more RAID groups included in each of the one or more pools, a plurality of first logical areas included in each of the one or more RAID groups, and a plurality of second logical areas configuring each of the plurality of first logical areas according to a first mode and a second mode, providing a plurality of virtual volumes to the computer so that one of the plurality of first logical areas included in the one or more RAID groups of at least one of the one or more pools are caused to correspond with a destination virtual volume of the write access when each write access is received from the computer, and allocating one or more of the plurality of second logical areas, belonging to at least one of the plurality of first logical areas that was caused to correspond with the destination virtual volume of the write access, to an area into which data of the destination virtual volume is to be written;

establishing a correspondence relationship between the plurality of first logical areas and the plurality of virtual volumes, releasing at least one of the plurality of the first logical areas, that was caused to correspond with at least one of the plurality of virtual volumes, from the at least one of the virtual volumes with which the one of the plurality of first logical areas is in the correspondence relationship, and determining each degree of importance regarding the at least one of the plurality of the first logical areas and releasing the at least one of the plurality of the first logical areas, starting from a first logical area with a lowest degree of importance, based on the determination result; and migrating, upon releasing the at least one of the plurality of first logical areas, data stored in the one or more allocated second logical areas belonging to one or more of the first logical areas to be released, to another one or more second logical areas belonging to another one or more first logical areas, and releasing the one or more allocated second logical areas from one or more virtual volumes with which the one or more allocated second logical areas are in the correspondence relationship, wherein the at least one of the plurality of the first logical areas are released according to the first mode or the second mode, and a number of the first logical areas included in the one or more RAID groups which correspond with each of the virtual volumes and which maintain correspondence without being released is different in the first mode and the in second mode.

* * * * *